(12) United States Patent
Holliday et al.

(10) Patent No.: US 10,878,051 B1
(45) Date of Patent: Dec. 29, 2020

(54) MAPPING DEVICE IDENTIFIERS

(71) Applicant: Palantir Technologies Inc., Palo Alto, CA (US)

(72) Inventors: Joseph Holliday, San Francisco, CA (US); Felix Wong, South San Francisco, CA (US); Howard Wulsin, Redondo Beach, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 246 days.

(21) Appl. No.: 15/941,729

(22) Filed: Mar. 30, 2018

(51) Int. Cl.
| | |
|---|---|
| *G06F 16/955* | (2019.01) |
| *G06F 16/22* | (2019.01) |
| *H04L 29/08* | (2006.01) |
| *H04W 8/00* | (2009.01) |
| *H04L 29/06* | (2006.01) |

(52) U.S. Cl.
CPC ........ *G06F 16/955* (2019.01); *G06F 16/2228* (2019.01); *H04L 63/0876* (2013.01); *H04L 67/22* (2013.01); *H04W 8/005* (2013.01)

(58) Field of Classification Search
CPC ............... G06F 16/9537; G06F 16/955; G06F 16/2228; H04W 8/005; H04L 63/0876; H04L 67/22
See application file for complete search history.

(56) References Cited

U.S. PATENT DOCUMENTS

| | | |
|---|---|---|
| 5,978,475 A | 11/1999 | Schneier et al. |
| 6,253,203 B1 | 6/2001 | O'Flaherty et al. |
| 6,725,240 B1 | 4/2004 | Asad et al. |
| 6,807,569 B1 | 10/2004 | Bhimani et al. |
| 7,017,046 B2 | 3/2006 | Doyle et al. |
| 7,069,586 B1 | 6/2006 | Winneg et al. |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Dennis Truong
(74) *Attorney, Agent, or Firm* — Sheppard Mullin Richter & Hampton LLP

(57) ABSTRACT

Systems, methods, and non-transitory computer readable media are provided for mapping device identifiers. Service event information of a first set of devices and a second set of devices may be obtained. The service event information may identify sets of device identifiers, sets of timestamps associated with the sets of devices, and sets of addresses associated with the sets of devices. A timestamp and an address of a device of the first set of devices may be identified and a time window may be determined based on the timestamp. Device identifiers of the second set of devices may be identified based on a comparison of the address with addresses of the second set of addresses that are associated with timestamps within the time window.

20 Claims, 6 Drawing Sheets

(56) References Cited

U.S. PATENT DOCUMENTS

| | | |
|---|---|---|
| 7,225,468 B2 | 5/2007 | Waisman et al. |
| 7,596,285 B2 | 9/2009 | Brown et al. |
| 7,770,032 B2 | 8/2010 | Nesta et al. |
| 7,801,871 B2 | 9/2010 | Gosnell |
| 7,962,495 B2 | 6/2011 | Jain et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,239,668 B1 | 8/2012 | Chen et al. |
| 8,301,904 B1 | 10/2012 | Gryaznov |
| 8,312,546 B2 | 11/2012 | Alme |
| 8,646,080 B2 | 2/2014 | Williamson et al. |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,931,043 B2 | 1/2015 | Cooper et al. |
| 9,021,260 B1 | 4/2015 | Falk et al. |
| 9,049,117 B1 | 6/2015 | Nucci et al. |
| 9,100,428 B1 | 8/2015 | Visbal |
| 9,185,137 B2* | 11/2015 | Amemiya ............... H04L 65/10 |
| 9,335,897 B2 | 5/2016 | Goldenberg |
| 9,338,013 B2 | 5/2016 | Castellucci et al. |
| 10,110,435 B2* | 10/2018 | Palanciuc ........... H04L 41/0893 |
| 2002/0112157 A1 | 8/2002 | Doyle et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kolmykov-Zotov et al. |
| 2006/0031928 A1 | 2/2006 | Conley et al. |
| 2006/0069912 A1 | 3/2006 | Zheng et al. |
| 2006/0179003 A1 | 8/2006 | Steele et al. |
| 2006/0212931 A1 | 9/2006 | Shull et al. |
| 2006/0218637 A1 | 9/2006 | Thomas et al. |
| 2006/0265747 A1 | 11/2006 | Judge |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2008/0288191 A1* | 11/2008 | Jurisch ............... G01R 19/2513 702/60 |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Mahaffey |
| 2010/0179831 A1 | 7/2010 | Brown et al. |
| 2010/0235915 A1 | 9/2010 | Memon et al. |
| 2010/0262688 A1 | 10/2010 | Hussain et al. |
| 2010/0305848 A1* | 12/2010 | Stallman ............. G06F 16/9537 701/465 |
| 2010/0330801 A1 | 12/2010 | Rouh |
| 2011/0060910 A1 | 3/2011 | Gormish et al. |
| 2011/0202555 A1 | 8/2011 | Cordover et al. |
| 2011/0219450 A1 | 9/2011 | McDougal et al. |
| 2012/0079592 A1 | 3/2012 | Pandrangi |
| 2012/0084866 A1 | 4/2012 | Stolfo |
| 2012/0110633 A1 | 5/2012 | An et al. |
| 2012/0110674 A1 | 5/2012 | Belani et al. |
| 2012/0169593 A1 | 7/2012 | Mak et al. |
| 2012/0218305 A1 | 8/2012 | Patterson et al. |
| 2012/0254129 A1 | 10/2012 | Wheeler et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0097709 A1 | 4/2013 | Basavapatna et al. |
| 2013/0110876 A1 | 5/2013 | Meijer et al. |
| 2013/0124309 A1* | 5/2013 | Traasdahl ............ G06F 9/5027 705/14.49 |
| 2013/0139268 A1 | 5/2013 | An et al. |
| 2013/0167196 A1* | 6/2013 | Spencer ................ H04W 8/22 726/3 |
| 2013/0239217 A1 | 9/2013 | Kindler et al. |
| 2014/0013451 A1 | 1/2014 | Kulka et al. |
| 2014/0059683 A1 | 2/2014 | Ashley |
| 2014/0123279 A1 | 5/2014 | Bishop et al. |
| 2014/0143009 A1 | 5/2014 | Brice et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0283107 A1 | 9/2014 | Walton et al. |
| 2014/0366132 A1 | 12/2014 | Stiansen et al. |
| 2015/0039565 A1 | 2/2015 | Lucas |
| 2015/0089568 A1* | 3/2015 | Sprague ............ H04L 63/0876 726/1 |
| 2015/0106198 A1* | 4/2015 | Miller ............... G06Q 30/0255 705/14.52 |
| 2015/0128274 A1 | 5/2015 | Giokas |
| 2015/0188715 A1 | 7/2015 | Castelluci et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2016/0004864 A1 | 1/2016 | Falk et al. |
| 2016/0028759 A1 | 1/2016 | Visbal |
| 2016/0224901 A1* | 8/2016 | Scarr ..................... H04W 4/029 |
| 2016/0253689 A1* | 9/2016 | Milton ................. H04W 4/029 705/7.34 |
| 2017/0039242 A1* | 2/2017 | Milton ............... G06Q 30/0269 |
| 2018/0014161 A1* | 1/2018 | Warren ............ G06F 16/24578 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

(56) References Cited

OTHER PUBLICATIONS

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

* cited by examiner

Table 210 (columns: Device ID 212, Timestamp, IP Address 214):

| Device ID | Timestamp | IP Address |
|---|---|---|
| PQRST | 11/01/2016 00:21 | 210.987.5.4 |
| FGHIJ | 11/01/2016 01:15 | 987.654.3.2 |
| KLMNO | 11/01/2016 02:22 | 109.876.5.2 |
| UVWXY | 11/01/2016 03:15 | 432.109.8.7 |
| ABCDE | 11/01/2016 04:00 | 123.456.7.8 |
| ... | ... | ... |
| JKLMN | 11/02/2016 05:15 | 954.364.2.8 |
| EFGHI | 11/02/2016 05:21 | 543.210.9.8 |
| OPQRS | 11/02/2016 05:36 | 542.107.6.5 |
| TUVWX | 11/02/2016 06:23 | 764.317.8.3 |
| ABCDE | 11/02/2016 07:00 | 012.345.6.7 |

Table 220 (columns: Device ID 222, Timestamp 224, IP Address; brackets 226, 228 mark 1 hour spans; 230):

| Device ID | Timestamp | IP Address |
|---|---|---|
| 12345 | 11/01/2016 03:02 | 123.456.7.8 |
| 23456 | 11/01/2016 03:08 | 456.789.1.2 |
| 45678 | 11/01/2016 03:30 | 789.012.3.4 |
| 67890 | 11/01/2016 03:42 | 123.456.7.8 |
| 56789 | 11/01/2016 03:57 | 901.234.5.6 |
| ... | ... | ... |
| 78901 | 11/02/2016 06:06 | 234.567.8.9 |
| 89012 | 11/02/2016 06:12 | 012.345.6.7 |
| 90123 | 11/02/2016 06:15 | 345.678.9.0 |
| 12345 | 11/02/2016 06:22 | 012.345.6.7 |
| 01234 | 11/02/2016 06:36 | 012.345.6.7 |

FIGURE 2

| Confidence | Device Count | % Share |
|---|---|---|
| 0% | 3,875 | 1% |
| 10% | 5,509 | 1% |
| 20% | 6,419 | 2% |
| 30% | 8,310 | 2% |
| 40% | 4,634 | 1% |
| 50% | 34,340 | 8% |
| 60% | 15,810 | 4% |
| 70% | 8,953 | 2% |
| 80% | 10,179 | 3% |
| 90% | 4,543 | 1% |
| 100% | 303,412 | 75% |

FIGURE 4

MAPPING DEVICE IDENTIFIERS

FIELD OF THE INVENTION

This disclosure relates to approaches for mapping device identifiers.

BACKGROUND

Different services may utilize different device identifiers to track the same devices. The difference in device identifiers across services may make it difficult to track a user's use of a device to interact with the services.

SUMMARY

Various embodiments of the present disclosure may include systems, methods, and non-transitory computer readable media configured to facilitate mapping of device identifiers. First service event information and second service event information may be obtained. The first service event information may identify a first set of device identifiers of a first set of devices using a first service, a first set of timestamps associated with the first set of devices, and a first set of addresses associated with the first set of devices. The second service event information may identify a second set of device identifiers of a second set of devices using a second service, a second set of timestamps associated with the second set of devices, and a second set of addresses associated with the second set of devices. A timestamp and an address of a device of the first set of devices may be identified based on the first service event information. A time window may be determined based on the timestamp. One or more device identifiers of the second set of devices may be identified based on a comparison of the address of the device of the first set of devices with addresses of the second set of addresses that are associated with timestamps within the time window.

In some embodiments, the first set of device identifiers may be of a different type than the second set of device identifiers. For example, the first set of device identifiers may be determined based on a first fingerprinting service and the second set of device identifiers may be determined based on a second fingerprinting service different from the first fingerprinting service.

In some embodiments, a device of the second set of devices may be mapped to the device of the first set of devices. The mapping of the device of the second set of devices to the device of the first set of devices may be performed based on a frequency of the identification of the device identifier(s) of the second set of devices. In some embodiments, the mapping of the device of the second set of devices to the device of the first set of devices may be performed further based on a confidence level.

In some embodiments, the mapping of the device of the second set of devices to the device of the first set of devices may be used to associate an analysis of the device of the first set of devices with the device of the second set of devices.

In some embodiments, the time window may include a duration of time preceding the timestamp, a duration of time following the timestamp, or a duration of time that includes the timestamp.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates example listings of device identifiers, timestamps, and addresses, in accordance with various embodiments.

FIG. 4 illustrates an example distribution of confidence, in accordance with various embodiments.

DETAILED DESCRIPTION

Figure 1:
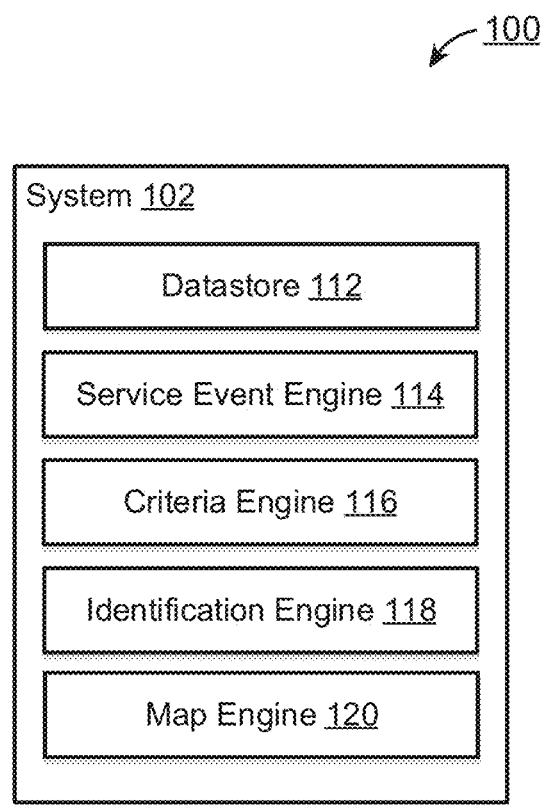
FIG. 1 illustrates an example environment for mapping device identifiers, in accordance with various embodiments.

A claimed solution rooted in computer technology overcomes problems specifically arising in the realm of computer technology. In various implementations, a computing system may be configured to obtain first service event information and second service event information. The first service event information may identify a first set of device identifiers of a first set of devices using a first service, a first set of timestamps associated with the first set of devices, and a first set of addresses associated with the first set of devices. The second service event information may identify a second set of device identifiers of a second set of devices using a second service, a second set of timestamps associated with the second set of devices, and a second set of addresses associated with the second set of devices. Device identifiers of devices may be generated by services referred to as fingerprinting services. Device identifiers of devices using different services may be generated by different fingerprinting services.

A timestamp and an address of a device of the first set of devices may be identified based on the first service event information. A time window may be determined based on the timestamp. The time window may include a duration of time preceding the timestamp, a duration of time following the timestamp, or a duration of time that includes the timestamp. One or more device identifiers of the second set of devices may be identified based on a comparison of the address of the device of the first set of devices with addresses of the second set of addresses that are associated with timestamps within the time window. A device of the second set of devices may be mapped to the device of the first set of devices. That is, the device of the second set of devices may be matched as being the same device as the device of the first set of devices.

In some embodiments, the first set of device identifiers may be of a different type than the second set of device identifiers. For example, the first set of device identifiers may be determined based on a first fingerprinting service and the second set of device identifiers may be determined based on a second fingerprinting service different from the first fingerprinting service. The first set of device identifiers may not be compatible with the second set of device identifiers.

In some embodiments, the mapping of the device of the second set of devices to the device of the first set of devices may be performed based on a frequency of the identification of the device identifier(s) of the second set of devices. In some embodiments, the mapping of the device of the second set of devices to the device of the first set of devices may be performed further based on a confidence level. For example, a user may change the confidence level depending on the objective of the device mapping. The frequency of the identification of the device identifier(s) and the confidence level may be linked. For instance, the frequency of the identification of the device identifier(s) may determine the confidence level.

In some embodiments, the mapping of the device of the second set of devices to the device of the first set of devices may be used to associate an analysis of the device of the first set of devices with the device of the second set of devices. For example, the device of the first set of devices may be part of an investigation, and the work performed for the investigation may be associated with the device of the second set of devices. Such association of analysis may facilitate leveraging of analysis of a device using the first service for analysis of the device using the second service.

The approaches disclosed herein may facilitate mapping of devices using multiple services. Different services may use different device identifiers to identify the same devices, and service event information may be used to determine whether different device identifiers across different services (e.g., services using different fingerprinting techniques) are the same device. Such mapping of devices/device identifiers across multiple services may enable use of information collected from interaction of a device with a service to be used for other services.

Device mapping disclosed herein may provide an alternative/higher quality way to track activities of a given person than using person identifiers, such as user account information. For instance, while a person may switch between different accounts to conduct different activities, the person will likely use the same device to conduct at least some of the different activities. Using device mapping to track activities of the person may facilitate detection of activities that may not be detectable and/or may be more difficult to detect than using person identifiers.

FIG. 1 illustrates an example environment 100 for mapping device identifiers. The example environment 100 may include a computing system 102. The computing system 102 may include one or more processors and memory. The processor(s) may be configured to perform various operations by interpreting machine-readable instructions stored in the memory. The environment 100 may also include one or more datastores (not shown) that is accessible to the computing system 102 (e.g., via one or more network(s)). In some embodiments, the datastore(s) may include various databases, application functionalities, application/data packages, and/or other data that are available for download, installation, and/or execution.

In various embodiments, the computing system 102 may include a datastore 112, a service event engine 114, a criteria engine 116, an identification engine 118, a map engine 120, other engines, and/or other components. The datastore 112 may include structured and/or unstructured sets of data that can be divided/extracted for provision when needed by one or more components of the environment 100. The datastore 112 may include one or more datasets of information. The datastore 112 may include one or more databases. The datastore 112 may include different data analysis modules that facilitate different data analysis tasks, patches for the applications/systems, custom application/functionalities built for particular application/systems, and/or other information to be used in the environment 100. While the computing system 102 is shown in FIG. 1 as a single entity, this is merely for ease of reference and is not meant to be limiting. One or more components/functionalities of the computing system 100 described herein may be implemented in a single computing device or multiple computing devices.

In various embodiments, the service event engine 114 may be configured to obtain service event information. Obtaining service event information may include accessing, acquiring, analyzing, determining, examining, identifying, loading, locating, opening, receiving, retrieving, reviewing, storing, and/or otherwise obtaining the service event information. For example, the service event engine 114 may search for and/or obtain service event information associated with one or more services (e.g., first service event information associated with a first service, a second service event information associated with a second service). Service event information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Service event information may be obtained from one or more databases (e.g., stored within the datastore 112). Service event information may be stored within a single file or across multiple files. For example, service event information associated with a particular service may have been ingested into a database as one or more objects, and the service event engine 114 may retrieve the object(s) to obtain the service event information.

Service event information may identify a set of device identifiers of a set of devices using a particular service, a set of timestamps associated with the set of devices, and a set of addresses associated with the set of devices. For example, the first service event information obtained by the service event engine 114 may identify a first set of device identifiers of a first set of devices using a first service, a first set of timestamps associated with the first set of devices, and a first set of addresses associated with the first set of devices while the second service event information obtained by the service event engine 114 may identify a second set of device identifiers of a second set of devices using a second service, a second set of timestamps associated with the second set of devices, and a second set of addresses associated with the second set of devices.

A set of devices may include one or more devices. A device may refer to one or more computing devices including processor(s), memory, and/or other components. A device may be used by a user to log into a service. A set of device identifiers may include one or more device identifier. A device identifier may refer to a distinctive identifier used to track a device. A device identifier may include a sequence of characters (e.g., letters, numbers, other symbols) and/or other information that identifies a particular device. A device identifier may be used to track usage of a device (e.g., with a service). A set of timestamps may include one or more timestamp. A timestamp may refer to a record (e.g., digital record) of the time of occurrence of an event. A timestamp may include a sequence of characters (e.g., letters, numbers, other symbols) and/or other information that identifies when a certain event occurred. For example, a timestamp may correspond to a time when a device logged into a service, when a device utilized a function of the service, when a device logged off from the service, and/or when the device otherwise interacted with the service. A set of addresses may include one or more addresses. An address may refer to a location of a device. A location of a device may refer to a physical location of the device and/or an electronic location of the device. For example, an address of a device may include an IP address of the device and/or other addresses of the device.

A device identifier may be specific to and/or associated with a particular service. A service may refer to one or more applications that provide one or more computer functionality to users and/or computing devices. For example, a service may provide users and/or computing devices with functions such as data storage, data access, data manipulation, data presentation, data communication, and/or other functions. A service may require a user to login before one or more functions are provided for use. For instance, a service may include a web-service that allows a user to utilize one or more functions by logging into the web-service using a device (logging into a web-service using a desktop, a laptop, a tablet, a mobile phone, and/or other mobile/non-mobile computing devices). Other types of services are contemplated.

Devices used to log into a service may be identified. That is, the identity of devices that are used to log into a service and that utilize the functions provided by the service may be identified. Identification of devices may be performed using a collection of information relating to the devices. That is, various information about a device used to log into a service may be collected to generate a device identifier for the device. For example, IP address of a device, a type of browser used by the device, the operating system/version of the device, and/or other distinguishing characteristics of the device may be used to generate a device identifier for the device. Information about a device may be provided by the device itself and/or other computing device(s), such as networking device(s) through which the device connects to the service. Information about a device may be determine using one or more proxy piercing technologies. For example, a device may be using a virtual private network and a proxy piercing technology may be used to determine the original IP address of the device.

Device identifiers for devices may be generated by services referred to as fingerprinting services. A finger printing service may be part of the system that provides the service logged into by a user, or it may be external to such a system. For instance, a user may be required to log into a web service to utilize the functions of the web service. The system (e.g., server) that provides the web service may include a finger printing service to generate a device identifier for the user's device or may utilize a finger printing service external to the system (e.g., third-party fingerprinting service provided over a network) to generate the device identifier for the user's device.

Different types of device identifiers may be generated by different fingerprinting services. Different fingerprinting services may utilize different information about devices and/or may utilize the same information about devices the same way or in different ways to generate device identifiers. A device identifier for a device generated by one fingerprinting service may be different from a device identifier for the same device generated by another fingerprinting service. Device identifiers generated by different fingerprinting services may not be compatible with each other. That is, device identifiers for a device generated by a fingerprinting service may be used to track the interactions between the device and the service associated with the fingerprinting service. However, because of the difference in the types of device identifiers generated by different fingerprinting services, a device identifier for a device generated by one fingerprinting service for one particular service may not be used to track the interaction of the same device with another service using a different fingerprinting service. A single device used to log into multiple services using different fingerprinting services may be identified by different/incompatible device identifiers. Such difference in device identifiers for a single device makes it difficult to track the device and/or the user using the device over multiple services. Using a single fingerprinting service across multiple services may allow individual devices utilizing the multiple services to be identified and tracked using the same device identifier. However, use of a single fingerprinting service across multiple services may not be practical. For example, it may be expensive to change fingerprinting services for different services to use the same fingerprinting service. Different services may be provided by different providers, who may utilize their own fingerprinting service or their own choice of fingerprinting service.

In various embodiments, the criteria engine 116 may be configured to obtain one or more criteria for identifying device identifiers. Obtaining one or more criteria may include accessing, acquiring, analyzing, determining, examining, identifying, loading, locating, opening, receiving, retrieving, reviewing, storing, and/or otherwise obtaining the one or more criteria. The device identifiers may be identified for mapping. That is, one or more device identifiers from one set of device identifiers and one or more device identifiers from another set of device identifiers may be identified for mapping between each other. A criterion for identifying device identifiers may refer to one or more factors, parameters, variables, conditions, and/or other information based on which device identifiers may be identified.

Criteria for identifying device identifiers may include information relating to a device included within one of the service event information (obtained by the service event engine 114). The criteria engine 116 may obtain information relating to a particular device included within one of the service event information (e.g., the first service event information), where the particular device is the device to which device identifiers in other service event information (e.g., the second service event information) are to be mapped. For example, the criteria engine 116 may identify one or more device identifiers, one or more timestamps, one or more addresses, and/or other information of a device of the first set of devices based on the first service event information. The device for which information is identified may be selected based on user/system selection, the service event information, and/or other information. For example, a user and/or a system may be interested in exploring usage of a particular device and the particular device may be selected for use by the criteria engine 116 to identify its device identifier(s), timestamp(s), address(es), and/or other information from the service event information. The criteria engine 116 may search the entries within the service event information that fall within a certain time period to identify the device identifier(s), timestamp(s), address(es), and/or other information for the device. For example, the criterion engine 116 may identify all instances of a particular device identifier, and the associated timestamps and addresses, within a given time period (e.g., a day, a month, a year) in the service event information.

As another example, the criteria engine 116 may analyze the service event information to select a device. For instance, the criteria engine 116 may analyze the service event information corresponding to a given amount of time (e.g., a day, a month, a year) and select device(s) that include a certain number of entries within the given amount of time, that include the most number of entries within the given number of time, that exhibit certain patterns of usage within the given amount of time, and/or that have other associated information within the given amount of time. Other selections of device for which information is identified are contemplated.

Criteria for identifying device identifiers may include one or more time windows within which information within the other service event information may be searched. Time window(s) may be determined based on the identified timestamp(s). That is, the criteria engine 116 may have identified a particular entry (containing device identifier, timestamp, and address) within the service event information (e.g., first service event information) for a device that corresponds to an event that occurred at a particular time (identified by the timestamp). The time window(s) within which information within the other service event information (e.g., second service event information) may be searched may be determined based on the timestamp within the particular entry. The time window may include a duration of time preceding the timestamp, a duration of time following the timestamp, or a duration of time that includes the timestamp (includes both time before and following the timestamp). For example, the identified timestamp within the first service event information may identify Nov. 1, 2016, 4:00 AM as a time when an event occurred. The time window within which information within the second service event information may be searched may include an hour preceding Nov. 1, 2016, 4:00 AM, an hour following Nov. 1, 2016, 4:00 AM, or an hour surrounding Nov. 1, 2016, 4:00 AM. A time window that surround the timestamp may be evenly or unevenly positioned with respect to the timestamp. That is, the time window may have the same time duration or different time durations on different sides of the timestamp.

The length of the time window may be set or variable. For example, same or different lengths of time window may be used for different types of devices. The length of the time window may be changed based on user input, based on type of event that is being analyzed, and/or based on how users are likely to use their computing devices to use different services. For example, if a user is expected to user one service for a short duration (e.g., minutes) before using another service, the time window may be configured for a shorter duration than while if the user is expected to use the one service for a long duration (e.g., hours) before using the other service. In some implementations, increasing the length of the time window may result in greater number of devices being identified for matching while increasing the number of false matches in mapping devices.

In various embodiments, the identification engine 118 may be configured to identify one or more device identifiers of the second set of devices based on one or more criteria obtained by the criteria engine 116 and/or other information. For example, the identification engine 118 may identify one or device identifiers of the second set of devices based on the identified address(es) of the device of the first set of devices, the time window(s), and/or other information. The identification engine 118 may compare the addresses within the second service event information to the address identified by the criteria engine 116 to identify the device identifiers within the second service event information that are associated with the same address identified by the criteria engine 116. The comparison of the addresses within the second service event information may be limited to those addresses that are associated with timestamps within the time window (s). Thus, device identifier(s) of the second set of devices may be identified by the identification engine 118 based on a comparison of the address(es) of the device of the first set of devices with addresses of the second set of devices (second set of addresses) that are associated with timestamps within the time window(s). Use of other criteria to identify device identifiers of the second set of devices are contemplated. For instance, rather than using addresses, other parameters that are common between different service event information may be used to identify the device identifiers.

In various embodiments, the map engine 120 may be configured to map a device of the second set of devices to the device of the first set of devices. That is, the device of the second set of devices may be matched as being the same device as the device of the first set of devices. Mapping a device of the second set of devices to the device of the first set of devices may include mapping the device identifier of the device of the second set of devices to the device identifier of the device of the first set of devices. Different device identifiers in different service event information (e.g., different device identifiers generated by different fingerprinting services) may be determined to correspond to the same device. For example, a device may be used to utilize two different services. One service may use a particular device identifier (e.g., generated by a particular fingerprinting service) to identify the device and the other service may use a different device identifier (e.g., generated by a different fingerprinting service) to identify the same device. The two different device identifiers may be mapped to each other, meaning that they correspond to the same device.

The map engine 120 may map the device of the second set of devices to the device of the first set of devices based on the identification of device identifier(s) of the second set of devices by the identification engine 118. The map engine 120 may map one, some, or all devices corresponding to the identified device identifier(s) of the second set of devices. For example, the map engine 120 may map a device of the second set of devices to the device of the first set of devices based on the any identification of the device identifiers of the second set of devices associated with addresses that match the identified address(es) of the device of the first set of devices. As another example, the map engine 120 may map a device of the second set of devices to the device of the first set of devices based on a frequency of the identification of the device identifier(s) of the second set of devices associated with addresses that match the identified address(es) of the device of the first set of devices. For instance, the map engine 120 may map a device of the second set of devices to the device of the first set of devices based on the associated device identifier of the device of the second set of device being identified (e.g., address(es) of the associated device identifier matching between the identified address(es) of the device of the first set of device) a threshold number of times. For example, the map engine 120 may require there to be a set/minimum number of matches before the corresponding devices are mapped to each other. The map engine 120 may map a device of the second set of devices to the device of the first set of devices based on the associated device identifier of the device of the second set of devices being identified the largest number of times. For example, multiple device identifiers of the second set of devices may be identified by the identification engine 118 and the device identifier having address(es) that match the identified address(es) of the device of the first set of devices may be selected for mapping. Use of other patterns of matching for device mapping are contemplated.

In some implementation, the map engine 120 may map the device of the second set of devices to the device of the first set of devices further based on historical information. Historical information may relate to prior identification of device identifiers, prior mapping of devices, and/or other historical data. For example, prior identification of device identifiers may be used to increase the number of matching between addresses of device identifier. Prior mapping of devices may be used to confirm more recent mapping between devices and/or to weight one or more identification of device identifiers more heavily than others. For example, the identification of device identifiers may have resulted in the same number of identifications of two different device identifiers of the second set of devices for a particular device identifier of a device of the first set of devices. One of the device identifiers of the second set of devices may have been mapped the device of the first set of devices previously, and the prior mapping may be used to weight the same device identifier more than the other device identifier for mapping.

In some embodiments, the map engine 120 may map the device of the second set of devices to the device of the first set of devices based on a confidence level. A confidence level may refer to the probability that the mapping between the devices is accurate. The map engine 120 may map the devices based on the confidence level such that any matching that falls beneath the confidence level is rejected from mapping. The confidence level may be changed based on the objective of the mapping. For example, a user/system may lower the confidence level to map devices with lower accuracy or may raise the confidence level to map devices with higher accuracy. Lowering the confidence level may result in greater number of devices being mapped while raising the confidence level may result in fewer number of devices being mapped.

In some embodiments, the mapping of the device of the second set of devices to the device of the first set of devices may be used to associate an analysis of the device of the first set of devices with the device of the second set of devices. Such association of analysis may facilitate leveraging of analysis of a device using the first service for analysis of the device using the second service. For example, the device of the first set of devices may be part of an investigation, and the work performed for the investigation may be associated with the device of the second set of devices, where the device of the second set of devices is identified (with some level of confidence) to be the same device as the device of the first set of devices. As another example, activities of a particular device using a first service may be identified as being problematic. Based on the mapping of devices, activates of the particular device using a second service may be identified as being problematic/potentially problematic and/or identified for further investigation. Based on the mapping of devices, activities of the particular device using the second service may be blocked, the user's account for the second service may be suspended, and/or the second service for the user/the device may otherwise be changed.

FIG. 2 illustrates example lists 210, 220 of device identifiers, timestamps, and addresses, in accordance with various embodiments. The information shown within the list 210 may be included in service event information for a particular service (Service A). The information shown within the list 220 may be included in service event information for another service (Service B). For example, the list 210 may show device identifiers, timestamps, and IP addresses of devices that interacted with the Service A. The list 220 may show device identifiers, timestamps, and IP addresses of devices that interacted with the Service B. A user/system may want to see if a device that used the Service A also used the Service B. For example, a user/system may want to see if a device identified by the device identifier ABCDE (device ABCDE) for Service A was also used to interact with the service B. The timestamps and the IP addresses associated with the device ABCDE may be identified within the list 210. For example, an entry 212 may list a timestamp of Nov. 1, 2016, 4:00 AM as a time when an event within Service A occurred with respect to the device ABCDE, with the device ABCDE using an IP address of 123.456.7.8. An entry 214 may list a timestamp of Nov. 2, 2016, 7:00 AM as a time when an event within Service A occurred with respect to the device ABCDE, with the device ABCDE using an IP address of 012.345.6.7.

Device identifiers of devices that interacted with the Service B may be identified based on a comparison of the IP addresses of the device ABCDE with addresses in the list 220. The search of IP addresses in the list 220 may be limited to those entries having timestamps within one or more time window. For example, the time windows for searching the list 220 may include an hour preceding the events identified for the device ABCDE in the list 210. That is, entries in the list 220 from 3:00 AM to 4:00 AM on Nov. 1, 2016 may be searched for the IP address 123.456.7.8 and entries in the list 220 from 7:00 AM to 6:00 AM on Nov. 2, 2016 may be searched for the IP address 012.345.6.7. Other time windows may be used.

Search of the list 220 may result in identification of device identifiers 12345 (listed in an entry 222 and an entry 228), 67890 (listed in an entry 224), 89012 (listed in an entry 226), and 01234 (listed in an entry 230). That is, a device 12345, a device 67890, a device 59012, or a device 01234 that used the service B may be identified as a potential match for the device ABCDE that used the service A.

Figure 3:
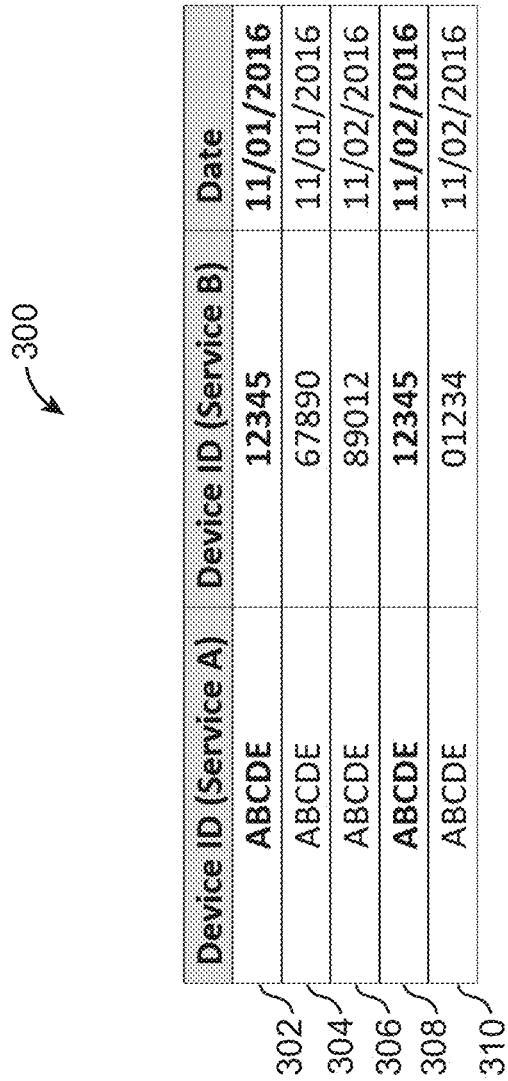
FIG. 3 illustrates an example list of device identifier matches, in accordance with various embodiments.

FIG. 3 illustrates an example list 300 of device identifier matches, in accordance with various embodiments. The matches of device identifiers shown in the list 300 may correspond to the identification of device identifiers shown in FIG. 2. As shown in the list 300, the device ABCDE that used the service A may be matched with four different devices that used the service B. An entry 302 may show a match in IP addresses of the device ABCDE with the device 12345 on Nov. 1, 2016. An entry 304 may show a match in IP addresses of the device ABCDE with the device 67890 on Nov. 1, 2016. An entry 306 may show a match in IP addresses of the device ABCDE with the device 89012 on Nov. 2, 2016. An entry 308 may show a match in IP addresses of the device ABCDE with the device 12345 on Nov. 2, 2016. An entry 310 may show a match in IP addresses of the device ABCDE with the device 01234 on Nov. 2, 2016.

One of more of the devices 12345, 67890, 89012, 01234 may be mapped to the device ABCDE based on the matching IP addresses. That is, one of more of the devices 12345,

67890, 89012, 01234 matched as being the same device as the device ABCDE. For example, the device with the most number of matches may be mapped to the device ABCDE. In such as case, the device 12345 (which has two matches to the device ABCDE) may be mapped to the device ABCDE. Other mapping of devices are contemplated.

FIG. 4 illustrates an example distribution of confidence 400, in accordance with various embodiments. The distribution of confidence 400 may list the confidence level of mapping between devices that used different services. A confidence level may refer to the probability that the mapping between the devices using different services is accurate. For example, a confidence level of 40% may indicate that 40% of matching of IP addresses between device identifiers that used two different services may belong to the same matching pair of device identifiers, such as the matching of device identifier ABCDE to device identifier 12345 shown in FIG. 3. The distribution of confidence 400 shows that 75% of device mappings were performed with 100% confidence level.

Figure 5:
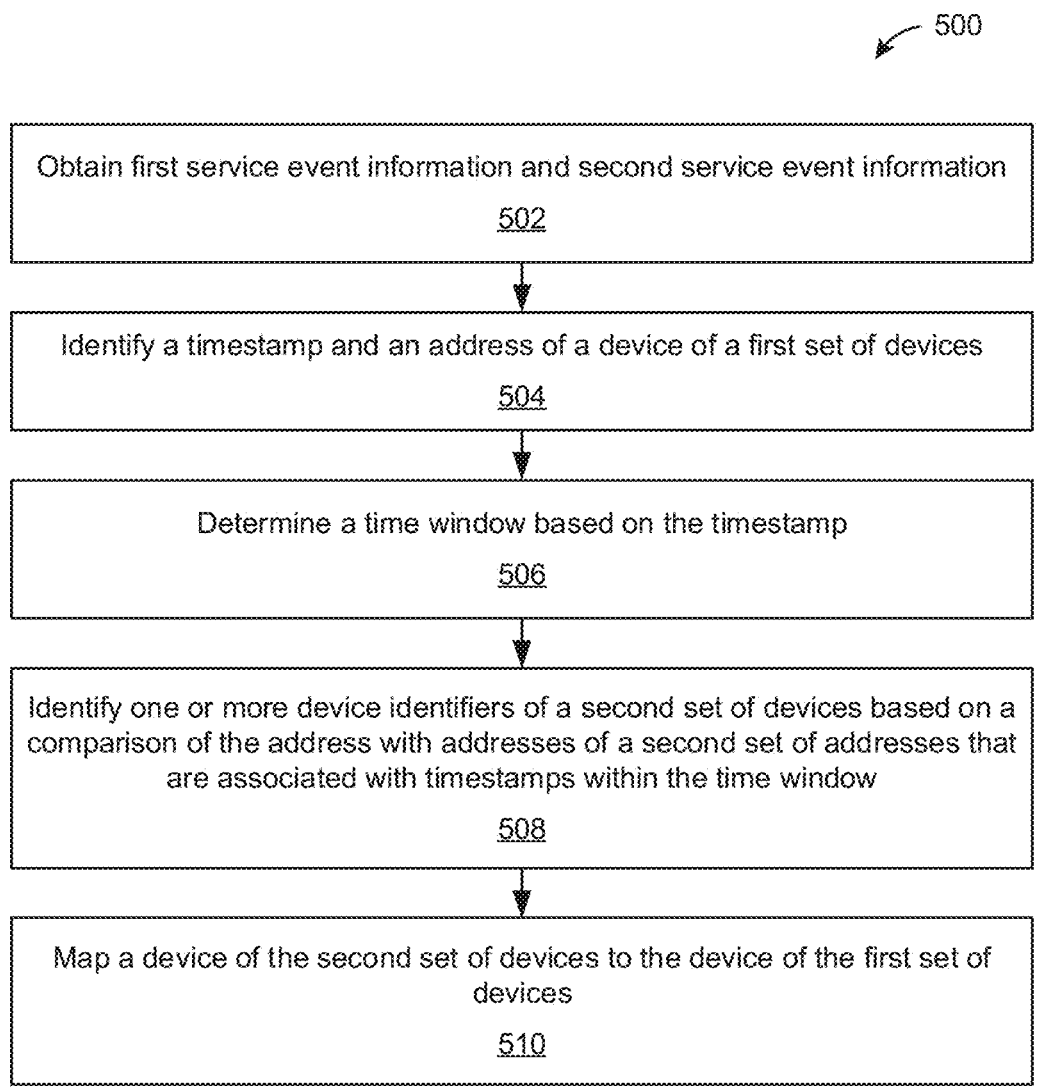
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, first service event information and second service event information may be obtained. The first service event information may identify a first set of device identifiers of a first set of devices using a first service, a first set of timestamps associated with the first set of devices, and a first set of addresses associated with the first set of devices. The second service event information may identify a second set of device identifiers of a second set of devices using a second service, a second set of timestamps associated with the second set of devices, and a second set of addresses associated with the second set of devices. At block 504, a timestamp and an address of a device of the first set of devices may be identified based on the first service event information. At block 506, a time window may be determined based on the timestamp. At block 508, one or more device identifiers of the second set of devices may be identified based on a comparison of the address with addresses of the second set of addresses that are associated with timestamps within the time window. At block 510, a device of the second set of devices may be mapped to the device of the first set of devices.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
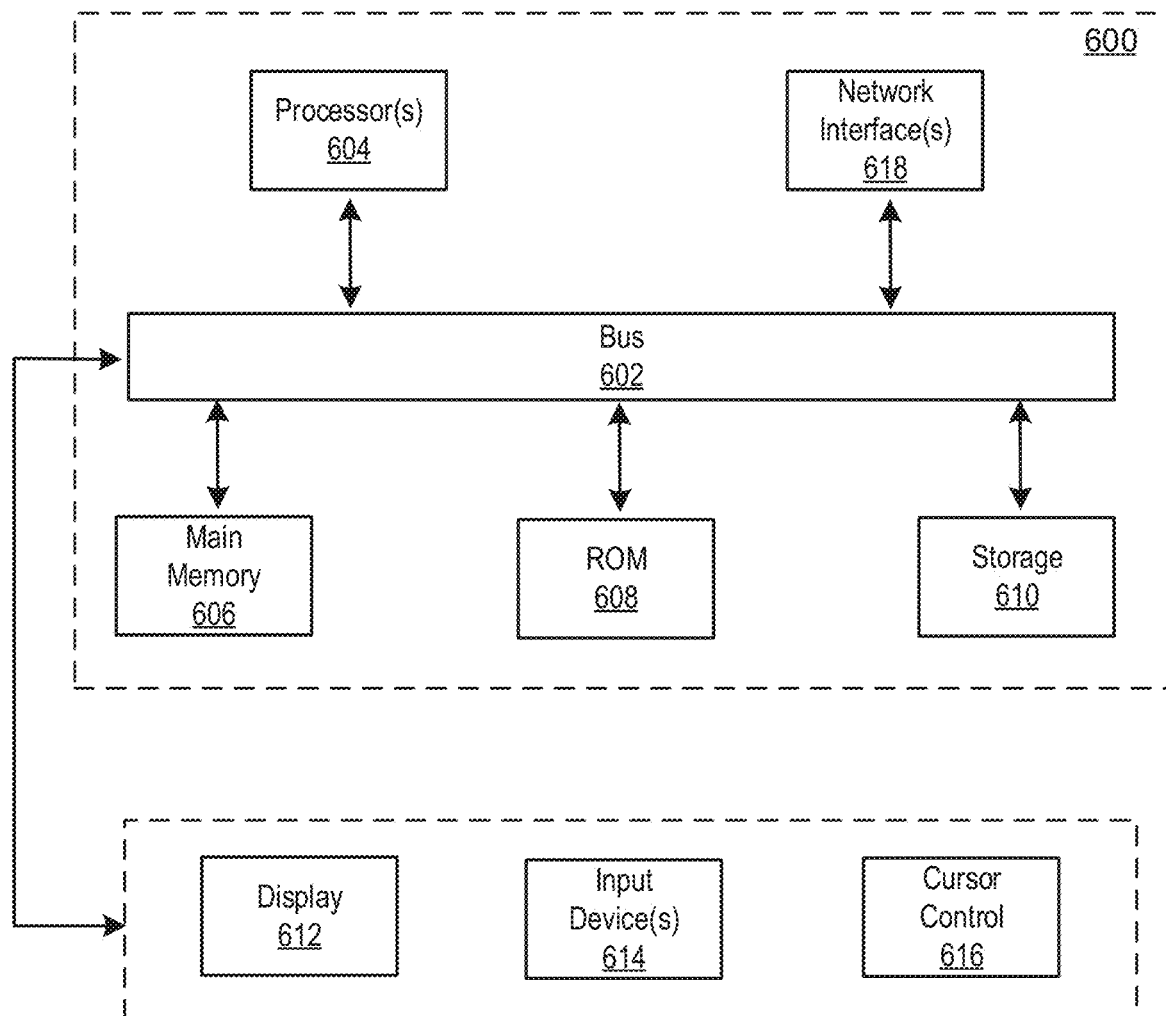
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
memory storing instructions that, when executed by the one or more processors, cause the system to perform:
obtaining first service event information, the first service event information identifying a first set of device identifiers of a first set of devices using a first service, a first set of timestamps associated with the first set of devices, and a first set of addresses associated with the first set of devices;
obtaining second service event information, the second service event information identifying a second set of device identifiers of a second set of devices using a second service, a second set of timestamps associated with the second set of devices, and a second set of addresses associated with the second set of devices;
identifying a timestamp and an address of a device of the first set of devices based on the first service event information;
determining a time window based on the timestamp, a type of the first service or a type of the second service, and an expected duration of use of the type of the first service or the type of the second service;
and identifying one or more device identifiers of the second set of devices based on a comparison of the address with addresses of the second set of addresses that are associated with timestamps within the time window.

2. The system of claim 1, wherein the first set of device identifiers are of a different type than the second set of device identifier.

3. The system of claim 2, wherein the first set of device identifiers are determined based on a first fingerprinting service and the second set of device identifier are determined based on a second fingerprinting service different from the first fingerprinting service.

4. The system of claim 1, wherein the instructions, when executed by the one or more processors, further cause the system to perform mapping a device of the second set of devices to the device of the first set of devices.

5. The system of claim 4, wherein the mapping of the device of the second set of devices to the device of the first set of devices is used to associate an analysis of the device of the first set of devices with the device of the second set of devices.

6. The system of claim 4, wherein the mapping of the device of the second set of devices to the device of the first set of devices is performed based on a frequency of the identification of the one or more device identifiers of the second set of devices.

7. The system of claim 6, wherein the mapping of the device of the second set of devices to the device of the first set of devices is performed further based on a confidence level.

8. The system of claim 1, wherein the identifying a device identifier further comprises:
identifying a second timestamp and a second address of the device of the first set of devices based on the first service event information, the second timestamp indicating a time at which the device logged into the first service, utilized a function of the first service, or logged off from the first service;
determining a second time window based on the second timestamp;
determining, from the second set of devices, a second device identifier in which corresponding one or more addresses have a highest combined number of matches with the address within the time window or with the second address within the second time window, compared to other device identifiers from the second set of devices; and
mapping, to the device, a second device corresponding to the determined second device identifier.

9. The system of claim 1, wherein the instructions, when executed, further cause the one or more processors to perform blocking activities of a device corresponding to the identified one or more device identifiers of the second set of devices.

10. A method implemented by a computing system including one or more processors and storage media storing machine-readable instructions, wherein the method is performed using the one or more processors, the method comprising:
obtaining first service event information, the first service event information identifying a first set of device identifiers of a first set of devices using a first service, a first set of timestamps associated with the first set of devices, and a first set of addresses associated with the first set of devices;
obtaining second service event information, the second service event information identifying a second set of device identifiers of a second set of devices using a second service, a second set of timestamps associated with the second set of devices, and a second set of addresses associated with the second set of devices;
identifying a timestamp and an address of a device of the first set of devices based on the first service event information;
determining a time window based on the timestamp, a type of the first service or a type of the second service, and an expected duration of use of the type of the first service or the type of the second service; and
identifying one or more device identifiers of the second set of devices based on a comparison of the address with addresses of the second set of addresses that are associated with timestamps within the time window.

11. The method of claim 10, wherein the first set of device identifiers are of a different type than the second set of device identifier.

12. The method of claim 11, wherein the first set of device identifiers are determined based on a first fingerprinting service and the second set of device identifier are determined based on a second fingerprinting service different from the first fingerprinting service.

13. The method of claim 10, wherein the instructions, when executed, further cause the one or more processors to perform mapping a device of the second set of devices to the device of the first set of devices to associate an analysis of the device of the first set of devices with the device of the second set of devices.

14. The method of claim 10, wherein the instructions, when executed, further cause the one or more processors to perform mapping a device of the second set of devices to the device of the first set of devices based on a frequency of the identification of the one or more device identifiers of the second set of devices.

15. The method of claim 14, wherein the mapping of the device of the second set of devices to the device of the first set of devices is performed further based on a confidence level.

16. A non-transitory computer readable medium comprising instructions that, when executed, cause one or more processors to perform:
obtaining first service event information, the first service event information identifying a first set of device identifiers of a first set of devices using a first service, a first set of timestamps associated with the first set of devices, and a first set of addresses associated with the first set of devices;
obtaining second service event information, the second service event information identifying a second set of device identifiers of a second set of devices using a second service, a second set of timestamps associated with the second set of devices, and a second set of addresses associated with the second set of devices;
identifying a timestamp and an address of a device of the first set of devices based on the first service event information;
determining a time window based on the timestamp, a type of the first service or a type of the second service, and an expected duration of use of the type of the first service or the type of the second service; and
identifying one or more device identifiers of the second set of devices based on a comparison of the address with addresses of the second set of addresses that are associated with timestamps within the time window.

17. The non-transitory computer readable medium of claim 16, wherein the first set of device identifiers are of a different type than the second set of device identifier.

18. The non-transitory computer readable medium of claim 17, wherein the first set of device identifiers are determined based on a first fingerprinting service and the second set of device identifier are determined based on a second fingerprinting service different from the first fingerprinting service.

19. The non-transitory computer readable medium of claim 16, wherein the instructions, when executed, further cause the one or more processors to perform mapping a device of the second set of devices to the device of the first set of devices to associate an analysis of the device of the first set of devices with the device of the second set of devices.

20. The non-transitory computer readable medium of claim 16, wherein the instructions, when executed, further cause the one or more processors to perform mapping a device of the second set of devices to the device based on a frequency of the identification of the one or more device identifiers of the second set of devices.

* * * * *